(Model.)
J. F. WALLACE.
SIDE BEARING FOR CAR TRUCKS.
No. 305,492. Patented Sept. 23, 1884.
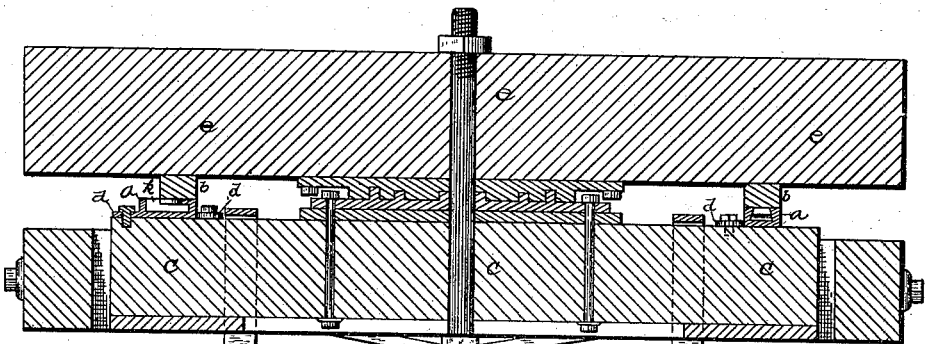
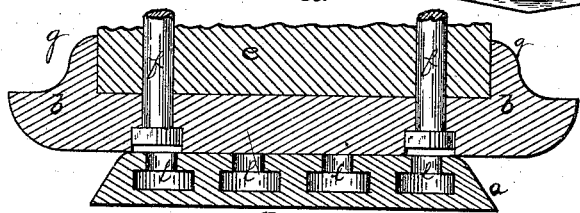
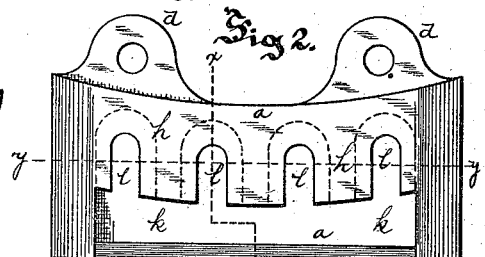
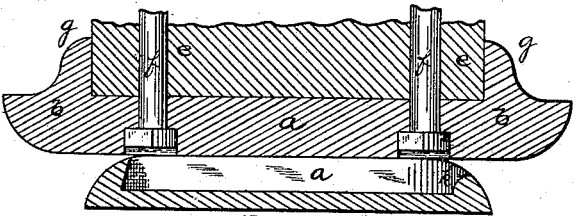
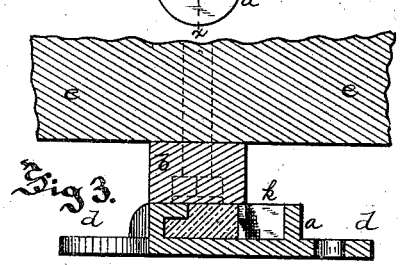
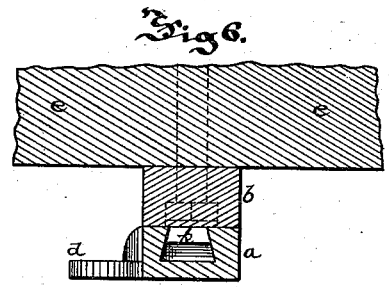
Witnesses.
Inventor.
John F. Wallace
by James D. Kay
Attorney

UNITED STATES PATENT OFFICE.

JOHN F. WALLACE, OF PITTSBURG, PENNSYLVANIA.

SIDE BEARING FOR CAR-TRUCKS.

SPECIFICATION forming part of Letters Patent No. 305,492, dated September 23, 1884.

Application filed June 4, 1884. (Model.)

*To all whom it may concern:*

Be it known that I, JOHN F. WALLACE, of Pittsburg, in the county of Allegheny and State of Pennsylvania, have invented a new and useful Improvement in Side Bearings for Railroad-Car Trucks; and I do hereby declare the following to be a full, clear, and exact description thereof.

My invention relates to the side bearings employed between the bolsters connecting the bodies of cars to their trucks, these bearings being employed on each side of the center plates through which the king-bolt passes in securing together the bolsters of the truck and the car-body. These side bearings have heretofore been formed of wood or metal, and in some cases a seat or depression has been formed in the face of the bottom bearing for the reception of packing and oil to lubricate the wearing-faces of the bearings; but as there was no means of removing and replacing the packing in the seat when the car was secured to the truck, consequently the packing soon wore away, and as the faces of the bearings were dry, friction was created when the truck turned under the car, and, besides wearing off the side bearings, the flanges of the wheels wore off much more rapidly, the wheels often wearing sharp, and for this reason being more liable to climb the rails, and cause accident.

The object of my invention is to provide a side bearing which can be packed and oiled while the car-body is resting on the truck; and to this end it consists, essentially, in a side bearing having its bottom bearing provided with one or more cavities or seats for packing, and one or more openings communicating therewith at the side or end of the bearing, whereby said cavities may be packed and the bearing oiled while the top bearing is resting on the bottom bearing.

It also consists in certain means for retaining the saturated cotton waste or packing within the cavities.

It also consists in forming the packing seats or cavities of a series of recesses extending into the wearing-face of the bearing from an oiling-space or basin at the side of and beyond the wearing-face.

To enable others skilled in the art to make and use my invention, I will describe the same more fully, referring to the accompanying drawings, in which—

Figure 1 is a central section of the car-bolsters illustrating my invention. Fig. 2 is a plan view of the bottom bearing. Fig. 3 is a cross-section of the bearing on the line *x x*, Fig. 2. Fig. 4 is a longitudinal section on the line *y y*, Fig. 2; and Figs. 5, 6, and 7 are like views of another form of bearing embodying my invention.

Like letters of reference indicate like parts in each.

The bottom bearings, $a$, of the side bearings are bolted to the truck-bolster $c$ through the lips $d$, and the top bearings, $b$, are secured to the car-body bolster $e$ by bolts $f$ passing through them, the top bearings being provided with flanges $g$ fitting on either side of the bolster. The top bearing has a flat wearing-face over the wearing-face $h$ of the bottom bearing, and it may either be straight or curved, corresponding to the curve of the wearing-face $h$, as shown.

Two forms of the bottom bearing embodying the invention are shown, and that shown in Figs. 1 to 4 will be first described. The wearing-face $h$ corresponds in width to that of the top bearing, and along one side of the face $h$ is the packing space or opening $k$, the walls of said opening being of the same height as the face $h$, and forming also a basin to hold the oil. Leading out from this basin $k$ are the cavities or packing-seats $l$, which extend into the wearing-face $h$, and are adapted to receive and retain cotton waste or other packing which will absorb the oil and by capillary attraction hold it in contact with the wearing-face of the upper side bearing. These packing-cavities $l$ are made of greater width and depth at the base than at the top, the walls being formed dovetailed, and either gradually increasing in width, as shown in Fig. 6, or being undercut, as shown in Figs. 1, 3, and 4, and indicated on dotted lines in Fig. 2. They are thus adapted to receive and retain a larger amount of the packing, and to prevent the packing from being drawn up out of the cavities by the action of the top bearings. The bottom bearings, on account of the side opening or basin, $k$, hold a large amount of oil or saturated packing, and, because the packing-cavities can be packed or cleaned and oil furnished thereto while the top bearings are resting thereon, the side bearings can be kept well lubricated, so that the friction between their faces is greatly reduced. The truck can, therefore, turn under the car more easily in traveling around curves, and, consequently, the cars may be more heavily loaded, the power necessary to draw the cars around curves is lessened, and the wear on the wheel-flanges is greatly reduced.

The side bearing shown in Figs. 5, 6, and 7 is found well adapted for the purpose, though not as desirable a form as that previously described, as the packing and oil are introduced under the top bearing instead of at the side thereof. The packing cavity or recess extends the entire length of the bottom bearing $a$, and the packing-opening $k$ is at the end of the bearing, the end wall being cut away to give free entrance to the packing-cavity. The packing, saturated with oil, may be introduced and withdrawn by means of a hook, the packing being pushed by said hook into the cavity, and after the bearing is properly packed, the waste being packed tight at the end of the cavity to retain the oil therein. The said bearings may of course be employed to advantage in many places where like bearings are employed, and when so used are included within my invention.

What I claim as my invention, and desire to secure by Letters Patent, is—

1. A side bearing having its bottom bearing provided with one or more cavities or seats for packing, and one or more openings communicating therewith at the side or end of the bearing, whereby said cavities may be packed and oiled while the top bearing is resting thereon, substantially as set forth.

2. A bottom side bearing having one or more cavities for the reception of saturated waste or packing, and an opening communicating therewith at the side or end, said cavities having means, substantially as described, for retaining the packing within them, substantially as and for the purposes set forth.

3. A side bearing having its bottom bearing provided with a packing and oiling space or basin at the side thereof, beyond the top bearing, communicating with packing-cavities or seats in the wearing-face of the bearing, substantially as and for the purposes set forth.

In testimony whereof I, the said JOHN F. WALLACE, have hereunto set my hand.

JOHN F. WALLACE.

Witnesses:
JAMES I. KAY,
J. N. COOKE.